May 1, 1962 W. W. TAYLOR, JR 3,031,995
PIPE FLANGING JIG
Filed May 13, 1959 2 Sheets-Sheet 1
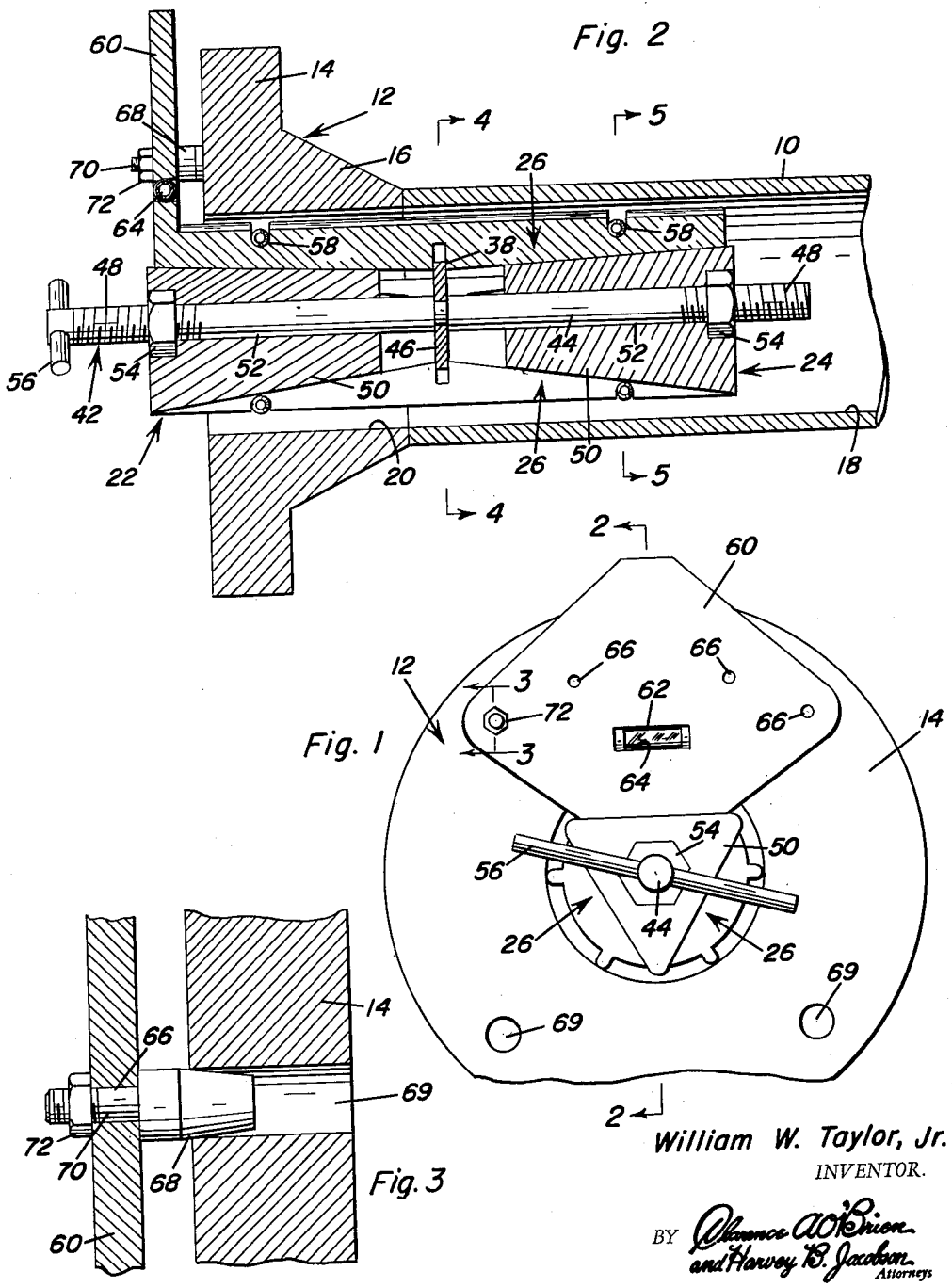
William W. Taylor, Jr.
INVENTOR.

William W. Taylor, Jr.
INVENTOR.

United States Patent Office 3,031,995
Patented May 1, 1962

3,031,995
PIPE FLANGING JIG
William W. Taylor, Jr., 6410 Prescott Road,
Baton Rouge, La.
Filed May 13, 1959, Ser. No. 812,875
3 Claims. (Cl. 113—103)

This invention relates in general to new and useful improvements in welding jigs, and more specifically to an improved jig for welding flanges onto pipe.

When a pipe flange is welded onto the end of a pipe, it is highly desirable that the pipe flange be disposed concentric to the pipe. Otherwise, the misalignment between the pipe flange and the pipe will result in a restriction of the pipe which will reduce the capacity of the pipe and subject the projecting portions to undue wear.

It is therefore the primary object of this invention to provide a pipe flanging jig which is in the form of an expansible mandrel which may be placed into an end of a pipe and project through the pipe flange, the mandrel being capable of being expanded while being disposed within the pipe and pipe flange so as to tightly fit into the two and thus assure the mounting of the pipe flange concentric to the pipe.

In the welding of pipe flanges to pipes, it is necessary that the pipe flange be held in place rigidly during the welding operation. On the other hand, it is highly desirable that the pipe flange be quickly and easily mounted on the end of a pipe to which the pipe flange is to be welded.

It is therefore another object of the invention to provide a pipe flanging jig which includes an expansible mandrel which may be placed into one end of a pipe and passed through the pipe flange which it to be mounted on the pipe, the mandrel having an operator which may be quickly rotated so as to lock the mandrel within the pipe and the pipe flange in a single simple operation.

Still another object of the invention is to provide a novel mandrel for temporarily lining up and coupling a pipe flange to a pipe in concentric relation, the mandrel including a plurality of circumferentially spaced, elongated shoes, and an operator for expanding and springs for retracting the shoes, the operator including a shaft extending axially though the space defined by the shoes and having a centrally located collar rotatably journaled in the shoes to prevent relative longitudinal movement of the shaft with respect to the shoes, opposite ends of the shaft being provided with threads of opposite hand, and wedge blocks threadedly connected to the shaft whereby when the shaft is rotated the wedge blocks are moved towards each other or away from each other.

The customary pipe flange is provided with a plurality of bolt holes to facilitate the bolting of pipe flange to another pipe flange. It is necessary that the bolt holes of the pipe flanges be oriented with respect to the pipe, otherwise the pipe flanges of the two adjacent pieces of pipe may not be joined together. While no problem exists with straight length of pipe, where the pipe has bends, the pipe cannot be rotated to align the pipe flanges. Also, even with straight length pipe, it is necessary that the pipe flanges at opposite ends thereof be aligned with each other.

In view of the foregoing, it is a further object of the invention to provide a pipe flanging jig which includes a mandrel for holding a pipe flange concentric to the pipe to which it is to be welded, the pipe flanging jig further including a support engageable with the pipe flange for aligning the bolt holes of the pipe flange to assure the proper positioning of the bolt holes with respect to the pipe.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an end view of a pipe flange and shows the pipe flanging jig in place;

FIGURE 2 is a longitudinal sectional view taken substantially upon a plane indicated by the section line 2—2 of FIGURE 1 and shows the internal construction of the pipe flanging jig and the relationship thereof with respect to both the pipe flange and the pipe to which the pipe flange is being secured;

FIGURE 3 is an enlarged fragmentary sectional view taken substantially upon a plane indicated by the section line 3—3 of FIGURE 1 and shows the connection between the pipe flanging jig and the pipe flange to orient the pipe flange with respect to the pipe;

Figure 4:
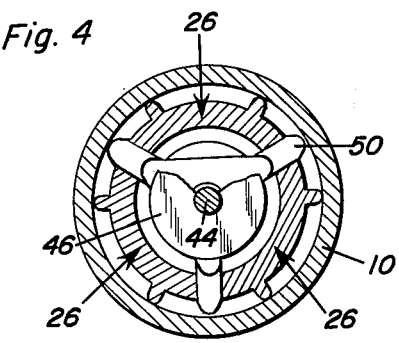
FIGURE 4 is a transverse sectional view taken substantialy upon the plane indicated by the section line 4—4 of FIGURE 2 and shows the details of the mandrel of the pipe flanging jig in the central portion thereof.
Figure 5:
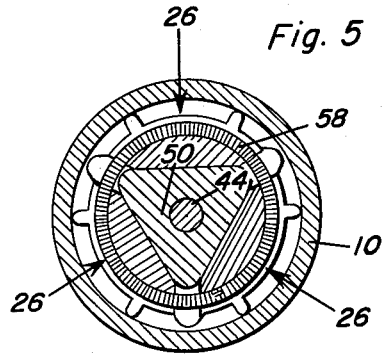
FIGURE 5 is a transverse sectional view taken substantially upon the plane indicated by the section line 5—5 of FIGURE 2 and shows the mounting of a return spring which encircles the shoes of the mandrel to constantly urge the shoes inwardly towards each other.

Referring now to the drawings in detail, it will be seen that there is illustrated in FIGURE 2 a pipe 10 and a pipe flange 12 to which the pipe 10 is to be secured. The pipe flange 12 includes a flange portion 14 and a connecting portion 16. The pipe 10 has a bore 18 and the pipe flange 12 has a bore 20. The bores 18 and 20 are of the same diameter and should be aligned when the pipe flange 12 is secured to the pipe 10.

In order to facilitate the alignment of the pipe flange 12 with respect to the pipe 10 and to hold the pipe flange 12 in alignment with the pipe 10 during a welding operation, there is provided the pipe flanging jig which is the subject of this invention, the pipe flanging jig being generally referred to by the numeral 22. The pipe flanging jig includes a mandrel which is generally referred to by the reference numeral 24. The mandrel 24 is formed of a plurality of circumferentially spaced, elongated shoes 26. In the form of mandrel illustrated, there are three shoes. However, the number of shoes may be varied as is desired.

Figure 6:
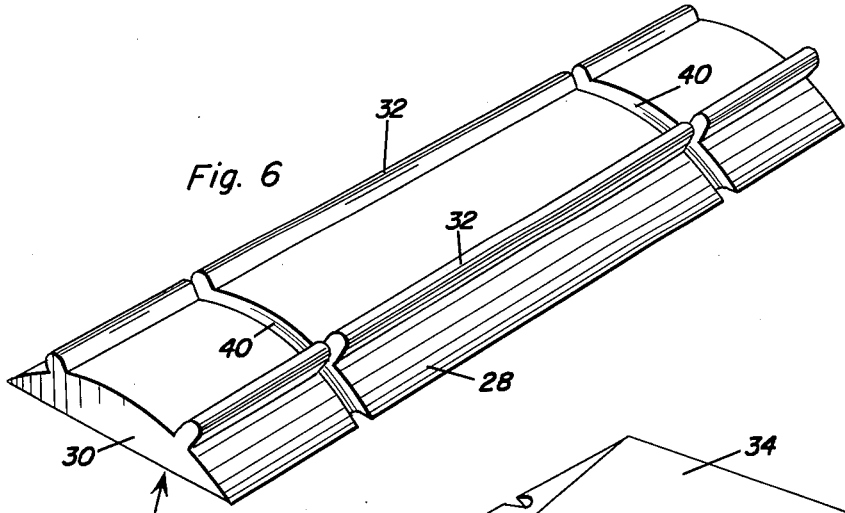
FIGURE 6 is an enlarged perspective view showing the exterior configuration of one of the shoes.
Figure 7:
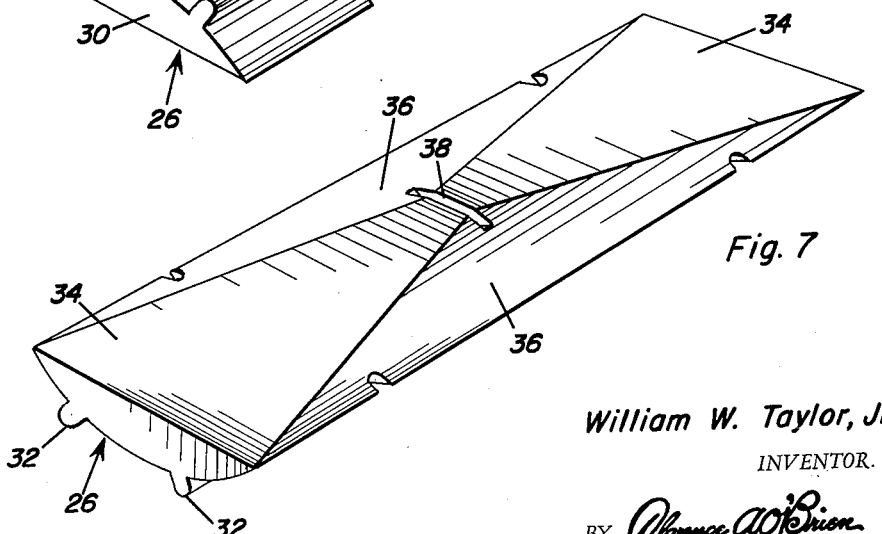
FIGURE 7 is another enlarged perspective view showing the inner surface of one of the shoes.

Referring now to FIGURES 6 and 7, the details of the shoes 26 will be best shown. Each of the shoes 26 includes a segmental cylindrical outer surface 28 and square cut ends 30. Ribs 32 project from the outer surface 28 and extend longitudinally thereof. It is to be noted that the ribs 32 have rounded outer portions.

As is best shown in FIGURES 2 and 7, the inner surface of each shoe 26 includes a pair of flat wedge engaging surfaces 34. The wedge engaging surfaces 34 are identical and taper inwardly towards each other, the shoe 30 being of a maximum thickness at its center. The arrangement of the wedge engaging surfaces 34 result in additional surfaces 36 which also taper towards the center of the inner surface of the shoe 26. A transverse recess 38 is formed in the inner surface of the individual shoe 26 at the intersection of the jig surfaces 34, the recess 38 also extending into the surfaces 36.

The outer surface 28 of each of the shoes 26 is provided with a pair of transverse grooves 40, the grooves 40 being spaced equally from opposite ends of the shoe 26 and being in the form of circumferential grooves. The grooves 40 will receive springs which will be described in detail hereinafter.

The mandrel 24 also includes an assemblage providing a novel operator which is generally referred to by the numeral 42. This operator 42 includes an elongated shaft 44 having a circular collar 46 secured to the central portion. The collar 46 is seated in the recesses 38 of the shoes 26 and thus prevents longitudinal movement of the shaft 44. The opposite ends of the shaft 44 are provided with threaded portions 48. The threaded portions 48 are of opposite hand.

Frusto-pyramidal wedges of triangular cross-section are positioned on opposite ends of the shaft 44, the wedges being referred to by the numeral 50. Each of the wedges 50 has a bore 52 therethrough receiving the shaft 44. A nut 54 is fixed within the outer end of each of the wedges 50 and is threadedly engaged on the corresponding threaded portion 48 of the shaft 44. In order to facilitate the rotation of the shaft 44, the left end thereof, as viewed in FIGURE 2, is provided with a transverse rod 56.

When the shoes 26 are assembled about the operator 42, the surfaces 34 thereof abut the outer surfaces of the wedges 50. The shoes 26 are held in this relation by coil springs 58 which are seated in the grooves 40 and are under tension to urge the shoes 26 inwardly towards the wedges 50. The coil springs 58 serve to return the shoes 26 from their extended positions after the mandrel has been used.

The uppermost one of the shoes 26 is provided with a plate 60 at the left end thereof. The plate 60 is disposed normal to the axis of the mandrel 24 and is generally diamond shaped in outline, as is best illustrated in FIGURE 1. The plate 60 is provided with a horizontal opening 62 in which a transversely disposed level 64 is positioned. In this manner the mandrel 24 may be adjusted until the top shoe 26 thereof is disposed uppermost.

The plate 60 is also provided with a plurality of circumferentially spaced bores or apertures 66 which have a radii corresponding to the radii of bolt holes 69 in the flange 14. The plate 60 selectively supports a tapered flange aligning plug 68, as is best shown in FIGURE 3. This plug 68 includes a reduced shank portion 70 which extends through a selected one of the bores 66 and has a nut 72 holding it in place with respect to the plate 60.

In operation the pipe flange 12 is first slid over the pipe flanging jig 22 from right to left, as viewed in FIGURE 2 and is aligned so that the plug 68 enters into the respective one of the bolt holes 69. The right hand end of the mandrel 24 is then slid into the left hand end of the pipe 10, after which the operator 42 is operated to expand the mandrel so that it frictionally engages the surfaces of the bores 18 and 20. The pipe flanging jig 22 is then rotated until the level 64 is in a horizontal position, at which time the pipe flanging jig 22 is tightened down to assure the concentricity of the bores 18 and 20. The pipe flange 12 is now ready to be welded to the pipe 10 in an oriented position relative thereto.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in lining up and supporting a pipe flange in prerequisite alignment with a cooperating open end of a pipe until said flange has been coupled to said pipe and finally welded, a manually insertable, removable and adjustable jig 22 comprising, in combination, a mandrel 24 embodying several similarly constructed companion elongated shoes 26, said shoes having outwardly disposed convex surfaces provided with spaced parallel lengthwise pipe engaging ribs 32, coil springs 58 embracing and grouping said shoes 26 in circumferentially spaced equidistant cooperating relationship, an operating device 42 for radially expanding the shoes against the tension of the springs 58, said shoes surrounding the operating device and said operating device including a shaft 44 extending axially through the space defined by the surrounding shoes 26 and having a centrally located collar 46 rotatably journaled in recess means 38 provided therefor at median portions of the encompassing shoes and preventing relative longitudinal movement of the shaft 44 with respect to the shoes 26, opposite end portions of said shaft being provided with screwthreads 48 of opposite hand, wedge blocks 50 having axial bores, said shaft passing through said bores, the outer ends of the bored portions of said blocks having nuts embedded therein operatively and adjustably mounted on the screwthreads provided therefor on said shaft, and an outer end of one of said shoes 26 being provided with an integral right angularly disposed plate which is adapted to confront a segmental portion of the aforementioned pipe flange, said plate being flat-faced and diamond-shaped in outline in a manner to function as a satisfactory handgrip when handling the complete assembly, and a flange aligning plug lateral to and detachably mounted on and projecting from said plate and adapted to project into an existing bolt hole such as is commonly provided in the aforementioned flange.

2. The structure defined in claim 1 and wherein said plate is provided at a lower central portion thereof with a prescribed opening, and a spirit level visibly mounted for use and confined in said opening.

3. For use in lining up and supporting a pipe flange in prerequisite alignment with a cooperating open end of a pipe until the flange has been coupled to the pipe and finally welded in its fixed position: a manually insertable, removable and adjustable jig 22 comprising, in combination, a mandrel 24 embodying several similarly constructed companion elongated shoes, said shoes having outwardly disposed surfaces adapted to accommodatingly contact encompassing surfaces of the usual bore through the pipe flange and bore of said pipe, said outer surfaces being provided with coacting grooves, coil springs 58 seated in their respective grooves and embracing and grouping the shoes 26 in circumferentially spaced equidistant cooperating relationship, an operating device 42 for radially expanding the shoes against the tension of said spring 58 said shoes 26 surrounding the operating device 42 and said operating device including a shaft 44 extending axially through the space defined by the surrounding shoes 26 and having a collar on a median portion of the shaft fixed and at right angles to the axis of the shaft, median interior surfaces of the shoes having coacting recesses, the outer peripheral portion of said collar being rotatably keyed in the coacting recesses 38 in a manner to prevent relative longitudinal movement of the shaft 44 with respect to the shoes 26, opposite terminal end portions of said shaft being provided with screw-threads 48 of opposite hand, wedge blocks having axial bores, said shaft passing through said bores, the outer ends of the bores having nuts embedded therein and operatively and adjustably mounted on the screw-threads provided therefor on said shaft, an outer end of a predetermined one of said shoes 26 being provided with an integral right angularly disposed plate 60 adapted to confront a segmental portion of the aforementioned pipe flange, said plate being provided with a plurality of bores, and a single flange-aligning plug, said plug having a reduced shank portion which may be fitted in and retained in a selected one of the bores with the plug extending at right angles to the vertical plane of the plate and in a direction toward the pipe flange, said pin having a free end adapted to project into an existing bolt hole in said flange.

References Cited in the file of this patent

UNITED STATES PATENTS

| | | |
|---|---|---|
| 402,107 | Ries | Apr. 23, 1889 |
| 1,879,122 | Davis | Sept. 27, 1932 |
| 2,226,078 | Spahn | Dec. 24, 1940 |
| 2,736,286 | Britton | Feb. 28, 1956 |

FOREIGN PATENTS

| | | |
|---|---|---|
| K24276VIIId/21h | Netherlands | Dec. 20, 1956 |